United States Patent
Kim et al.

(12)

(10) Patent No.: US 11,324,242 B2
(45) Date of Patent: May 10, 2022

(54) METHOD FOR PREPARING TOFU BY USING FREEZE COAGULATION

(71) Applicant: TAEJIN GNS CO., LTD., Incheon (KR)

(72) Inventors: Byoung-soub Kim, Incheon (KR); Yun-ho Lee, Incheon (KR); Gi-young Lee, Incheon (KR); Taeck-hyun Kim, Incheon (KR); Hye-jung Yun, Incheon (KR); Eun-bin Jang, Incheon (KR)

(*) Notice: Subject to any disclaimer, the term of this patent is extended or adjusted under 35 U.S.C. 154(b) by 393 days.

(21) Appl. No.: 16/479,610

(22) PCT Filed: Jun. 29, 2017

(86) PCT No.: PCT/KR2017/006899
§ 371 (c)(1),
(2) Date: Jul. 22, 2019

(87) PCT Pub. No.: WO2018/139715
PCT Pub. Date: Aug. 2, 2018

(65) Prior Publication Data
US 2021/0360952 A1    Nov. 25, 2021

(30) Foreign Application Priority Data

Jan. 24, 2017 (KR) .......................... 10-2017-0010812

(51) Int. Cl.
*A23L 11/45* (2021.01)
*A23P 30/10* (2016.01)
*A23C 20/02* (2021.01)

(52) U.S. Cl.
CPC ............ *A23L 11/45* (2021.01); *A23C 20/025* (2013.01); *A23P 30/10* (2016.08); *A23V 2002/00* (2013.01)

(58) Field of Classification Search
CPC ........ A23L 11/45; A23P 30/10; A23C 20/025; A23V 2002/00

USPC ....................................................... 426/634
See application file for complete search history.

(56) References Cited

FOREIGN PATENT DOCUMENTS

| JP | 09-252739 | 9/1997 |
| JP | 2011-067132 | 4/2011 |
| KR | 10-0079352 | 7/1994 |
| KR | 10-1999-0040616 | 6/1999 |

(Continued)

OTHER PUBLICATIONS

JP-2011-067132—Machine Translation. (Year: 2011).*

(Continued)

*Primary Examiner* — Hamid R Badr
(74) *Attorney, Agent, or Firm* — Antonio Ha; U.S. Patent, LLC

(57) ABSTRACT

The present invention relates to a method for preparing tofu by using freeze coagulation and, more specifically, to a method for preparing tofu and tofu prepared by the preparation method, the method comprising the steps of: cooling soymilk to an appropriate temperature; adding an appropriate coagulant into the cooled soymilk; freezing the soymilk into which the coagulant has been added; and maintaining the temperature to be below the freezing point and heating the frozen material after a predetermined time. The tofu according to the present invention has excellent mouthfeel and flavor and can be prepared having a structure and physical properties differentiated from those of conventional tofu.

9 Claims, 3 Drawing Sheets

(56) References Cited

FOREIGN PATENT DOCUMENTS

| | | |
|---|---|---|
| KR | 10-0719096 | 5/2007 |
| KR | 10-0891445 | 4/2009 |
| KR | 10-2010-0021703 | 2/2010 |
| KR | 10-2010-0136750 | 12/2010 |
| KR | 10-1640761 | 7/2016 |

OTHER PUBLICATIONS

English Specification of 10-0079352.
English Specification of 10-0891445.
English Specification of 2011-067132.
English Specification of 10-2010-0021703.
English Specification of 09-252739.
English Specification of 10-2010-0136750.
English Specification of 10-1999-0040616.

* cited by examiner

METHOD FOR PREPARING TOFU BY USING FREEZE COAGULATION

TECHNICAL FIELD

The present invention relates to a method of producing bean curd by freeze coagulation, and more particularly, to a method of producing bean curd in which soybean milk is cooled to an appropriate temperature, a coagulant is added thereto, and then the resulting soybean milk is frozen and the frozen material is heated after a certain period of time, thereby obtaining bean curd with an excellent texture and flavor and having texture and physical properties that are distinguished from existing kinds of bean curd.

BACKGROUND ART

Bean curd is a high-quality protein product made by coagulating protein of soybeans, and in conventional methods of producing bean curd, a coagulant is added to soybean milk produced by subjecting soybeans to soaking, grinding, boiling, and filtering processes to thereby coagulate the soybean milk.

More specifically, there are methods such as a method of cooling the soybean milk to a low temperature, i.e., about 10° C., followed by addition of a coagulant, packaging in a certain container, heating to a high temperature, i.e., about 85° C., and coagulation (soft bean curd and uncurdled bean curd), a method of coagulating the soybean milk at about 90° C. by adding a coagulant thereto, appropriately crushing, compressing, and cutting the coagulated product, and then packaging the resulting product (packed bean curd and pressed bean curd), and the like. The qualities (nutrition, texture, flavor, physical properties, and the like) of bean curd are becoming diverse to meet the various demands of consumers.

In this regard, the diversification of bean curd quality mainly depends on the coagulation temperature, the type of coagulant used, changes in compression and crushing processes, and the like.

Soft bean curd or uncurdled bean curd, which is produced by adding a coagulant to soybean milk at a low temperature and slowly heating the soybean milk to coagulate the soybean milk, has high water content (a water content of about 90%), and thus has a relatively low protein content, poor texture and taste, and poor physical properties, and therefore has limitations in use as a food material.

Coagulants that are typically used are classified into a fast-acting coagulant having a relatively fast coagulation rate and a slow-acting coagulant having a relatively slow coagulation rate. The fast-acting coagulant enables soybean milk to be coagulated into a localized mass, and thus has relatively high water release (water separation) to therefore have a low water content (a water content of about 85%), a high protein content, and physical rigidity, and accordingly, may be variously used as food materials (for stew and frying), but on the other hand is characterized by rough texture and poor flavor.

The slow-acting coagulant enables soybean milk to be coagulated as a single mass, and thus has relatively low water release to therefore have a high water content (a water content of about 90%) and a low protein content. However, when the slow-acting coagulant is used, the resulting bean curd has physical properties such as a relatively soft and less rigid texture, thus obtaining bean curd that is distinguished from bean curd produced using the fast-acting coagulant.

The moisture content or hardness of bean curd may be varied by controlling mechanical crushing and compression processes during a bean curd production process, but there is also not much difference in terms of the quality of bean curd.

The nutritional aspects, texture, taste, physical properties, and the like of soybean milk vary depending on the above-described factors, and these are the criteria for selection by soybean milk consumers. The characteristics of soybean milk are nutrition, texture, taste, physical properties, and the like.

Bean curd manufacturers have tried to improve these properties by variously changing a coagulation temperature, the selection of a coagulant, and mechanical factors such as crushing, compression, and the like, as described above, but these have limitations, and thus processed bean curds such as whole bean curd, bean curd skin, fried bean curd, and the like have been manufactured, and bean curd (dried bean curd) may also be produced by crushing and compression processes under an extremely high pressure that is not applied to general bean curd processing. This also results in a rough texture, and thus is unable to attract much attraction from consumers. In addition, bean curd fried in oil (fried tofu) has a somewhat glutinous texture, but is merely obtained by changing the surface texture of bean curd by frying the same in oil, and moreover has a negative image because it is a fried food.

In addition, there is bean curd produced by freezing bean curd prepared using the above-described processes at a low temperature and distributing the bean curd in a frozen state or subjecting the bean curd to secondary processing such as drying or the like, and techniques related to such frozen bean curd are disclosed in Korean Patent Registration Nos. 10-1640761, 10-0719096, 10-0079352, 10-0891445, and the like. These also have limitations in compensating for the disadvantages of existing bean curds.

Therefore, in order for bean curd to attract attention from consumers, it is required to conduct research on the development of bean curd with the following requirements: 1) a reduced moisture content and a relatively high nutrition content, 2) changing bean curd with a fragile texture to a tofu food with a glutinous texture, 3) having a nutty flavor without an off-flavor, which is the intrinsic unique flavor of bean curd, 4) having a texture and physical properties suitable for various cooking methods, and the like, i.e., bean curd that is completely different from existing bean curd.

The first key to achieving these goals is how to control the moisture content of coagulated bean curd, which is a critical factor in determining the physical properties, texture, and the like of bean curd. The inventors of the present invention have been interested in a method of controlling the moisture content of soybean milk during a coagulation reaction process, rather than a method of crushing and compressing the coagulated curd, which is a conventionally used water release method. In this regard, the moisture content of soybean milk is ultimately related to the initial concentration of soybean milk, and it is widely known that the use of high-concentration soybean milk improves physical properties, flavor, texture, texture compactness, and the like of bean curd compared to the case in which low-concentration soybean milk is used. The second key is to homogenize the entire bean curd through a slow coagulation reaction, like the case in which a slow-acting coagulant is used. It is necessary to delay the rate of reaction between a soybean milk protein and an acid or a metal salt, which is a coagulant, and in the case of coagulants that have already been discovered and are being used, the lower the temperature, the lower the reaction rate. Thus, in consideration of the above-described conditions, research has been conducted on physical properties, texture, flavor, yield, and the like of bean curd depending on the type of coagulant, the coagulant addition temperature, freezing conditions (temperature and freezing rate and time), thawing conditions (temperature and thawing rate and time), and heating conditions (temperature and heating rate and time). In particular, in the case in which a cooling temperature is slowly reduced to a freezing temperature or less and is maintained at that temperature, a water release phenomenon occurs in curd in which a coagulation reaction has slowly progressed during a cooling process after a coagulant is added. When the curd is heated to thus finish the coagulation reaction process, bean curd having a compact texture and excellent flavor is obtained.

DISCLOSURE

Technical Problem

Therefore, the present invention has been made in view of the above problems, and it is an object of the present invention to provide a method of producing bean curd in which soybean milk is cooled to an appropriate temperature, a coagulant is added thereto, and then the resulting soybean milk is frozen and the frozen material is heated after a certain period of time, thereby obtaining bean curd having an excellent texture and flavor and further having a unique and glutinous texture that is distinguished from existing developed bean curd, and bean curd produced using the method.

Technical Solution

In accordance with an aspect of the present invention, there is provided a method of producing bean curd, including: 1) cooling soybean milk; 2) adding a coagulant to the cooled soybean milk of process 1) above; and 3) freezing the resulting mixture of the soybean milk and the coagulant of process 2) above.

In accordance with another aspect of the present invention, there is provided a method of producing bean curd, including: 1) cooling soybean milk; 2) adding a coagulant to the cooled soybean milk of process 1) above; 3) freezing the resulting mixture of the soybean milk and the coagulant of process 2) above; and 4) heating the frozen soybean milk of process 3) above or curd after thawing or without thawing.

In accordance with another aspect of the present invention, there is provided a method of producing bean curd, including: 1) cooling soybean milk; 2) adding a coagulant to the cooled soybean milk of process 1) above; 3) freezing the resulting mixture of the soybean milk and the coagulant of process 2) above; 4) heating the frozen soybean milk of process 3) above or curd after thawing or without thawing; and 5) compressing the heated bean curd of process 4) above.

In accordance with another aspect of the present invention, there is provided bean curd produced using the production method according to the present invention, wherein the bean curd may have a texture in a uniformly layered form before compression, have a form arranged uniformly and densely in one direction after compression, and have a moisture content of 50% to 80% due to compression.

In accordance with another aspect of the present invention, there is provided a food substance prepared through processing such as cooking, seasoning, drying, freezing, pulverizing, or the like using the bean curd according to the present invention.

Advantageous Effects

In producing bean curd according to the present invention, it is possible to produce bean curd having an improved texture compared to the simple texture of existing bean curd and improved elasticity and texture together with the intrinsic flavor of bean curd.

In particular, since the present invention uses a novel coagulation method instead of using the existing complicated method of producing bean curd, it is possible to produce a new form of bean curd having excellent physical properties such as elasticity and the like and a rich flavor and texture even through a simple process.

In particular, bean curd according to the present invention has a texture in a uniformly layered form before compression, has a form arranged uniformly and densely in one direction after compression, is capable of having a moisture content of 80% or even less because compression dehydration is easy, has a high content of nutritional components such as protein and the like, and has a glutinous texture.

BEST MODE

Figure 1:
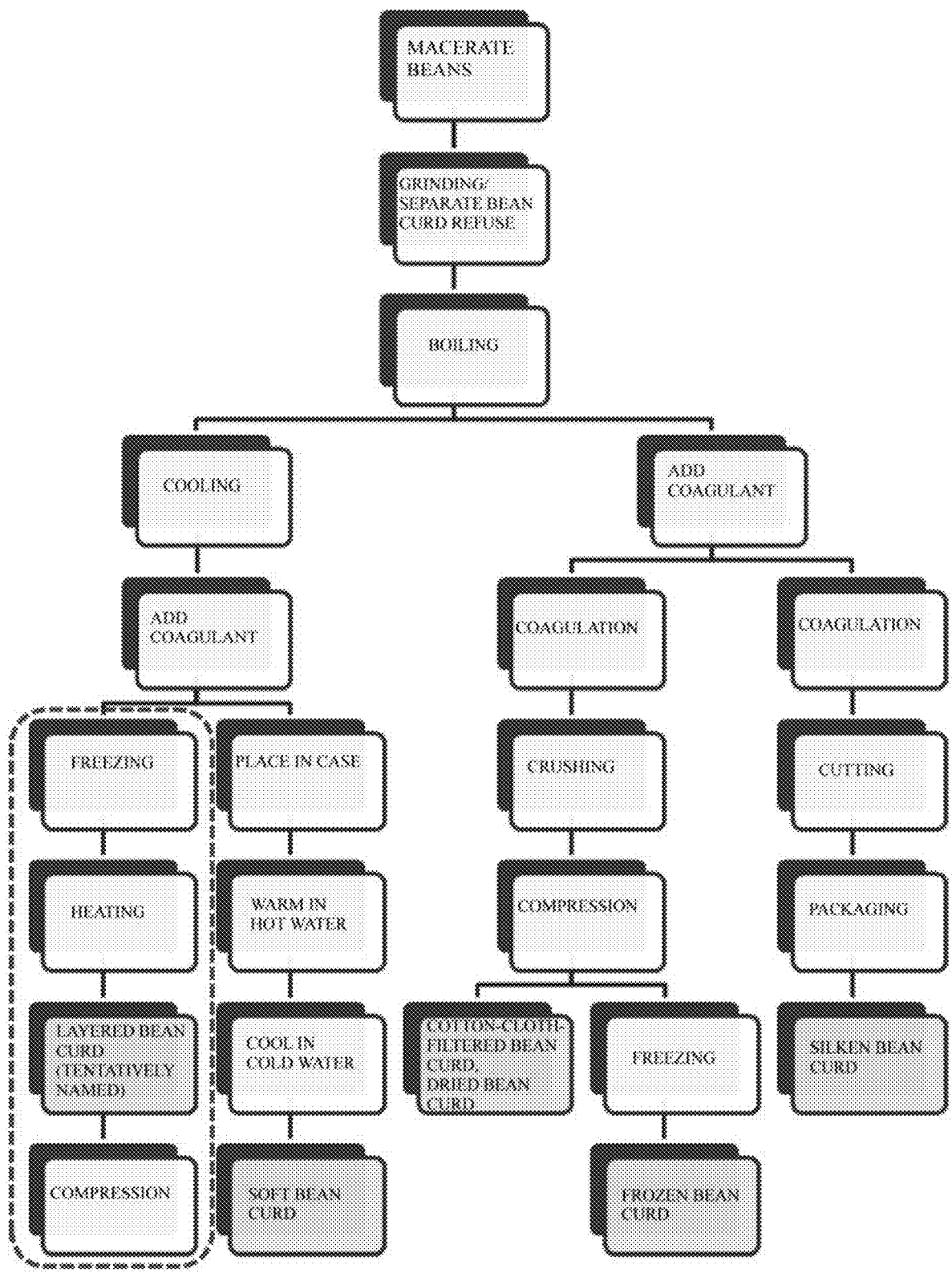
FIG. 1 is a diagram illustrating a comparison between a bean curd production method according to the present invention and a conventional bean curd production method.

Hereinafter, the present invention will be described in detail.

The present invention provides a method of producing bean curd, including:
1) cooling soybean milk;
2) mixing the cooled soybean milk of process 1) above with a coagulant; and
3) freezing the resulting mixture of the soybean milk and the coagulant of process 2) above.

The production method may further include a heating process after the freezing process and a compression process after the heating process.

For example, the production method may be performed using a method including:
a) immersing soybeans in water and then grinding the soybeans with water;
b) heating the soybeans;
c) filtering the soybeans to separate bean curd refuse;
d) cooling soybean milk filtered according to the present invention;
e) adding a coagulant thereto at an appropriate temperature according to the present invention;
f) freezing the soybean milk to which the coagulant is added while maintaining the temperature at a freezing point or less according to the present invention;
g) heating the frozen soybean milk according to the present invention after thawing or without thawing;
h) optionally performing compression as needed;
i) optionally performing molding as needed; and
j) optionally performing packaging as needed.

In particular, in the production method, the time taken to immerse and macerate soybeans in water in process a) above varies depending on the temperature, and may range from 5 hours to 8 hours in the summer season and from about 10 hours to about 18 hours in the winter season.

In the grinding process, soybeans and water may be mixed at a weight ratio of 1:5.5 to 1:6.5. When the weight ratio is less than 1:5.5, there is a problem with production yield. When the weight ratio exceeds 1:6.5, the concentration of soybean milk decreases, and thus coagulation does not occur satisfactorily.

The grinding process may be performed using a millstone, a mechanical grinder, or an electric grinder, and it is preferable to perform the grinding process using a grinder.

The heating process of process (b) above may be performed at a temperature of 95° C. to 105° C. for 2 minutes to 10 minutes.

In the heating process, a defoaming agent may be added as needed.

The heating process may be performed using a steam-heating pot.

In process c) above, the filtration may be performed using a general method, but the method is not particularly limited.

The cooling of the soybean milk in process 1) or d) above may be performed using either a method of immediately cooling the heated soybean milk using a heat exchanger or a method of gradually cooling the soybean milk after storage in a storage room.

In process 2) or e) above, a coagulant is added, and the coagulant for producing bean curd may be added in an amount of 0.2 wt % to 1.5 wt % with respect to 1 L of soybean milk.

In addition, the coagulant may be added to the cooled soybean milk at −5° C. to 30° C.

The soybean milk to which the coagulant is added may be injected into a packing container or a storage container.

In process 3) or f) above, to freeze the soybean milk to which the coagulant is added, the cooling temperature may be maintained at −196° C. to 0° C., particularly at −60° C. to 0° C.

The freezing time may be maintained for 10 minutes to 48 minutes. At this time, the soybean milk may be completely frozen to the inside thereof before use.

The thawing process of process g) above may be optionally performed as needed.

A container (a packing container or a separate container) that holds the thawed or unthawed soybean milk may be subjected to a final coagulation reaction by water bathing or direct heating at 50° C. to 120° C., particularly at 70° C. to 100° C. As needed, it may proceed to the process h) after the thawing process without the heating process.

The heating time may be between 1 minute and 120 minutes, preferably between 10 minutes and 120 minutes. Specifically, it is important to sufficiently heat the central portion of the produced bean curd.

In process h) above, the compression may be performed for the texture, physical properties, packaging, and the like of bean curd, and this process may be omitted as needed.

In process i) above, the molding may be performed for the marketability or packaging of bean curd, and this process may be omitted as needed.

With regard to process j) above, in process e) above, a packing container may have already been filled with the resulting soybean milk, or this process may be omitted as needed.

Through these processes, bean curd having a unique texture that is distinguished from existing developed bean curd may be produced.

The present invention also provides bean curd produced using the production method according to the present invention, wherein the bean curd may have a texture in a uniformly layered form before compression, have a form arranged uniformly and densely in one direction after compression, and have a moisture content of 50% to 80% due to compression.

The bean curd according to the present invention exhibits a texture in a uniformly layered form and a form arranged uniformly and more densely in one direction through compression, and shows a distinct difference from the irregular sponge-shaped form in the case in which bean curd produced using an existing method is simply frozen.

Bean curd generally has a moisture content of about 85%, and the lower limit of the moisture content of general bean curd produced using an existing developed method is about 75%, whereas the compressed bean curd produced according to the present invention has a moisture content of 60% or even less.

The present invention also provides a food substance using the bean curd according to the present invention.

The food substances may be various bean curd foods produced through processing such as cooking, seasoning, drying, freezing, grinding, and the like.

Hereinafter, the present invention will be described in more detail with reference to the following examples and comparative examples.

However, the following examples and comparative examples are provided for illustrative purposes only and are not intended to limit the scope of the present invention.

<Examples 1 to 4 and Comparative Examples 1 and 2> Production of Bean Curd According to Type of Coagulant 3.9 g of an emulsifying coagulant (Example 1 and Comparative Example 1), 1.3 g of magnesium chloride (Example 2), 1.3 g of calcium sulfate (Example 3), and 1.3 g of glucono delta lactone (Example 4) were each added to 500 g of soybean milk having a concentration of 10.5 brix, followed by 1) immersing soybeans in water and then grinding the soybeans with water; 2) heating; 3) filtering to separate bean curd refuse; 4) cooling the filtered soybean milk; 5) adding a coagulant thereto at an appropriate temperature; 6) freezing the soybean milk to which the coagulant is added while maintaining the temperature at a freezing point or less; and 7) heating the frozen soybean milk after thawing or without thawing, thereby completing the production of the bean curds of the examples, and the bean curds of the comparative examples were produced using a general method of producing cotton-cloth-filtered bean curd.

<Example 1> to <Example 4>

In particular, the production of bean curd according to the examples was carried out as follows.

To produce soybean milk, first, beans were sieved using a sieve or the like to remove impurities, were sufficiently washed, and were then immersed in water for 5 hours to 8 hours in the summer season and for about 10 hours to about 18 hours in the winter season. Subsequently, the macerated beans were ground using a grinder after water was added thereto. At this time, the amount of water that was added was 60 kg, which is about 6 times the amount (10 kg) of the beans as the raw material. The ground beans were heated using a steam-heating pot (adding a defoaming agent as needed), and then bean curd refuse was separated therefrom to thereby obtain soybean milk. The obtained soybean milk was placed in a separate container and cooled through heat exchange using cold water. When the temperature of the cooled soybean milk reached 15° C., the prepared coagulant was added to the respective containers and dispersed therein with stirring. Each container was stored in a household refrigerator at −20° C. for 24 hours to freeze the contents thereof. The frozen material was warmed in water at 80° C. for 60 minutes, thereby completing the production of bean curd.

Comparative Example 1

In particular, the production of cotton-cloth-filtered bean curd was carried out as follows.

To produce soybean milk, first, beans were sieved using a sieve or the like to remove impurities, were sufficiently washed, and were then immersed in water for 5 hours to 8 hours in the summer season and for about 10 hours to about 18 hours in the winter season. Subsequently, the macerated beans were ground using a grinder after water was added thereto. At this time, the amount of water that was added was 60 kg, which is about 6 times the amount (10 kg) of the beans as the raw material. The ground beans were heated using a steam-heating pot (adding a defoaming agent as needed), and then bean curd refuse was separated therefrom to thereby obtain soybean milk. The obtained soybean milk was appropriately stirred so as to be uniformly mixed with a coagulant, and then the bean curd in coagulated form was ground using an apparatus. The ground bean curd was injected into a molding box and compressed, and then the compressed bean curd was taken out of the molding box and cut to a certain size, thereby completing the production of bean curd.

Comparative Example 2

In particular, the production of frozen bean curd was carried out as follows.

Bean curd produced in the same manner as in <Comparative Example 1> was stored in a household refrigerator at −20° C. for 24 hours to freeze the contents thereof. Thereafter, the frozen material was warmed in water at 80° C. for 60 minutes and thawed.

A sensory test was performed on <Example 1> to <Example 4> and <Comparative Example 1> and <Comparative Example 2>.

The sensory test results were scored as shown in Table 1 below.

TABLE 1

| Score | 5 point | 4 point | 3 point | 2 point | 1 point | 0 point |
| --- | --- | --- | --- | --- | --- | --- |
| Sensory test (flavor) | Very good | good | normal | poor | Very poor | indeterminable |
| Sensory test (texture) | Very good | good | normal | poor | Very poor | indeterminable |

As a result, as shown in Table 2 below, it was confirmed that the bean curds of <Example 1> to <Example 4> had flavor similar to the bean curd of <Comparative Example 1> and significantly enhanced texture regardless of the type of coagulant. It was also confirmed that they showed a distinct difference in flavor or texture compared to the simply frozen bean curd of <Comparative Example 2>.

Figure 2:
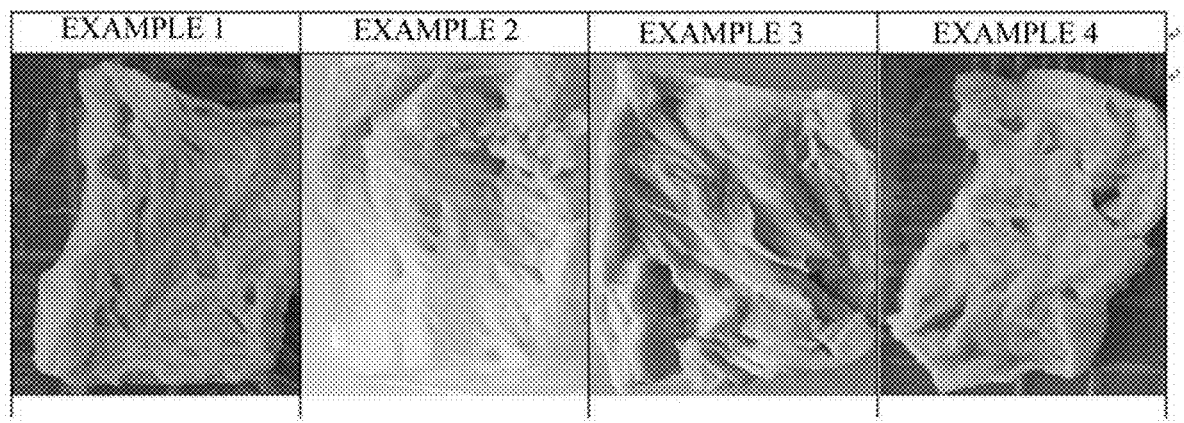
FIG. 2 is a set of images showing the cross-sections of bean curds according to examples of the present invention.
Figure 3:
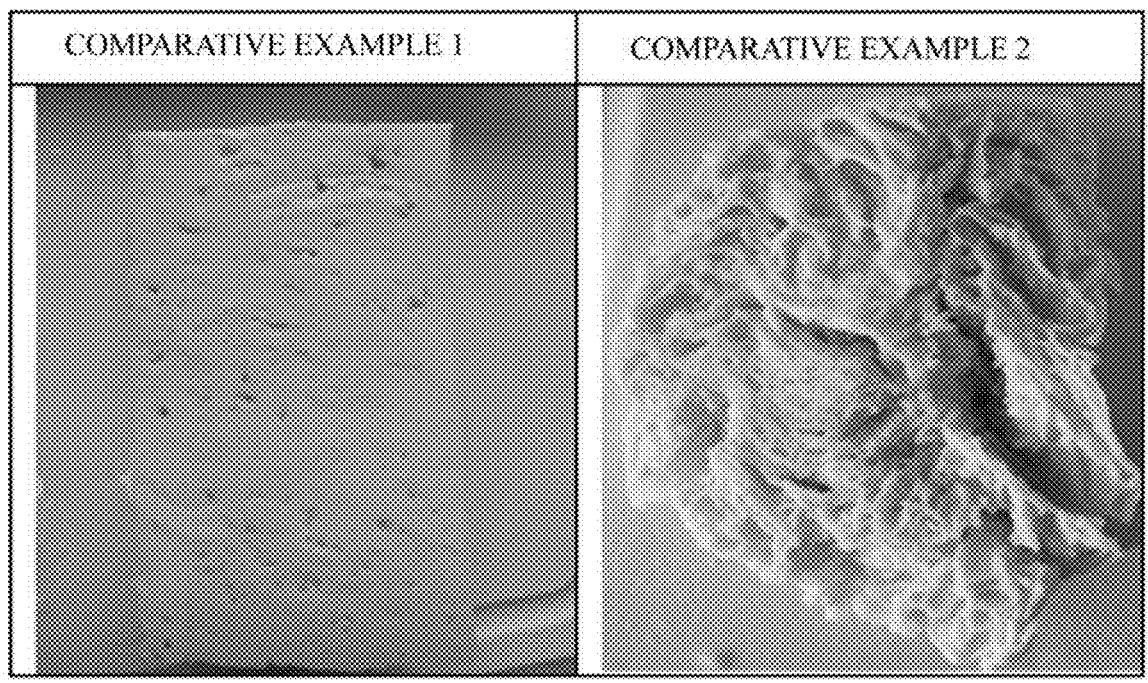
FIG. 3 is a set of images showing the cross-sections of bean curds according to comparative examples of the present invention.

In addition, cross-sections of the bean curds of <Example 1> to <Example 4> and <Comparative Example 1> and <Comparative Example 2> were compared with one another, and as illustrated in FIGS. 2 and 3, the bean curds of <Example 1> to <Example 4> had a texture in a uniformly layered form, showing a distinct difference from the typical bean curd of <Comparative Example 1>. In addition, when the bean curd of <Comparative Example 2>, produced using an existing method, was simply frozen, a sponge-shaped irregular form was evident, unlike <Example 1> to <Example 4> (see FIGS. 2 and 3).

<Examples 5, 6, and 7> Production of Bean Curds According to Concentration of Soybean Milk 3.9 g of an emulsifying coagulant was added to 500 g of soybean milk having soybean milk concentrations of 9 brix (Example 5), 12 brix (Example 6), and 13 brix (Example 7), respectively, followed by the above-described bean curd production processes (1) to (7), thereby completing the production of bean curd.

To produce soybean milk, first, beans were sieved using a sieve or the like to remove impurities, were sufficiently washed, and were then immersed in water for 5 hours to 8 hours in the summer season and for about 10 hours to about 18 hours in the winter season. Subsequently, the macerated beans were ground using a grinder after water was added thereto. At this time, the amount of water that was added was 60 kg, which is about 6 times the amount (10 kg) of the beans as a raw material. The ground beans were heated using a steam-heating pot (adding a defoaming agent as needed), and then bean curd refuse was separated therefrom to thereby obtain soybean milk. The obtained soybean milk was placed in respective containers and cooled through heat exchange using cold water.

When the temperature of the cooled soybean milk reached 20° C., the prepared coagulant was added thereto and dispersed therein with stirring. Each container was stored in a household refrigerator at −20° C. for 24 hours to freeze the contents thereof. The frozen material was warmed in water at 80° C. for 60 minutes, thereby completing the production of bean curd.

TABLE 2

Sensory Test according to Type of Coagulant

| | Example 1 | Example 2 | Example 3 | Example 4 | Comparative Example 1 | Comparative Example 2 |
| --- | --- | --- | --- | --- | --- | --- |
| Coagulant | Emulsifying coagulant | Magnesium chloride | Calcium sulfate | G.D.L. | Emulsifying coagulant | Emulsifying coagulant |
| Sensory test (flavor) | 4 | 4 | 3 | 3 | 5 | 1 |
| Sensory test (texture) | 5 | 5 | 4 | 4 | 2 | 1 |
| Average | 4.5 | 4.5 | 3.5 | 3.5 | 3.5 | 1 |

TABLE 3

| Sensory Test according to Concentration of Soybean Milk | | | | |
| --- | --- | --- | --- | --- |
|  | Example 5 | Example 1 | Example 6 | Example 7 |
| Classification | 9 brix | 10.5 brix | 12 brix | 13 brix |
| Sensory test (flavor) | 4 | 4 | 4 | 4 |
| Sensory test (texture) | 4 | 5 | 5 | 5 |
| Average | 4 | 4.5 | 4.5 | 4.5 |

As a result, as shown in Table 3 above, it can be seen that texture was enhanced in the case in which a high concentration of soybean milk was used compared to the case in which a low concentration of soybean milk was used.

<Examples 8, 9, and 10> Production of Bean Curd According to Coagulant Addition Temperature 3.9 g of an emulsifying coagulant was added to 500 g of soybean milk having a concentration of 10.5 brix, followed by the above-described bean curd production processes (1) to (7), thereby completing the production of bean curds.

To produce soybean milk, first, beans were sieved using a sieve or the like to remove impurities, were sufficiently washed, and were then immersed in water for 5 hours to 8 hours in the summer season and for about 10 hours to about 18 hours in the winter season. Subsequently, the macerated beans were ground using a grinder after water was added thereto. At this time, the amount of water added was 60 kg, which is about 6 times the amount (10 kg) of the beans as a raw material. The ground beans were heated using a steam-heating pot (adding a defoaming agent as needed), and then bean curd refuse was separated therefrom to thereby obtain soybean milk. The obtained soybean milk was placed in respective separate containers and cooled through heat exchange using cold water.

When the temperature of the cooled soybean milk reached 0° C. (Example 8), 20° C. (Example 9), and 30° C. (Example 10), respectively, the prepared coagulant was added thereto and dispersed therein with stirring. Each container was stored in a household refrigerator at −20° C. for 24 hours to freeze the contents thereof. The frozen material was warmed in water at 80° C. for 60 minutes, thereby completing the production of bean curds.

TABLE 4

| Sensory Test according to Coagulant Addition Temperature | | | | |
| --- | --- | --- | --- | --- |
|  | Example 8 | Example 1 | Example 9 | Example 10 |
| Classification | 0° C. | 15° C. | 20° C. | 30° C. |
| Sensory test (flavor) | 4 | 4 | 3 | 1 |
| Sensory test (texture) | 5 | 5 | 4 | 2 |
| Average | 4.5 | 4.5 | 3.5 | 1.5 |

As a result, as shown in Table 4 above, it was confirmed that, when the coagulant was added at a temperature higher than the appropriate temperature, protein coagulation rapidly occurred, and thus the bean curd texture was destroyed during freezing, resulting in deteriorated flavor and texture.

<Examples 11, 12, and 13> Production of Bean Curd According to Freezing Temperature 3.9 g of an emulsifying coagulant was added to 500 g of soybean milk having a concentration of 10.5 brix, followed by the above-described bean curd production processes (1) to (7), thereby completing the production of bean curds.

To produce soybean milk, first, beans were sieved using a sieve or the like to remove impurities, were sufficiently washed, and were then immersed in water for 5 hours to 8 hours in the summer season and for about 10 hours to about 18 hours in the winter season. Subsequently, the macerated beans were ground using a grinder after water was added thereto. At this time, the amount of water that was added was 60 kg, which is about 6 times the amount (10 kg) of the beans as a raw material. The ground beans were heated using a steam-heating pot (adding a defoaming agent as needed), and then bean curd refuse was separated therefrom to thereby obtain soybean milk. The obtained soybean milk was placed in respective separate containers and cooled through heat exchange using cold water.

When the temperature of the cooled soybean milk reached 15° C., the prepared coagulant was added to each container and dispersed therein while stirring. The respective containers were stored in a household refrigerator at −10° C. (Example 11), −5° C. (Example 12), and 0° C. (Example 13), respectively, for 24 hours to freeze the contents thereof. The frozen material was warmed in water at 80° C. for 60 minutes, thereby completing the production of bean curds.

TABLE 5

| Sensory Test according to Freezing Temperature | | | | |
| --- | --- | --- | --- | --- |
|  | Example 1 | Example 11 | Example 12 | Example 13 |
| Classification | −20° C. | −10° C. | −5° C. | 0° C. |
| Sensory test (flavor) | 4 | 4 | 4 | 4 |
| Sensory test (texture) | 5 | 5 | 4 | 2 |
| Average | 4.5 | 4.5 | 4 | 3 |

As a result, as shown in Table 5 above, it was confirmed that, since the freezing temperature was not sufficiently low, the entire soybean milk was not completely frozen and thus a flavor similar to that of <Comparative Example 1> was obtained during heating, but the texture was deteriorated.

<Examples 14, 15, and 16> Production of Bean Curd According to Freezing Time 3.9 g of an emulsifying coagulant was added to 500 g of soybean milk having a concentration of 10.5 brix, followed by the above-described bean curd production processes (1) to (7), thereby completing the production of bean curd.

To produce soybean milk, first, beans were sieved using a sieve or the like to remove impurities, were sufficiently washed, and were then immersed in water for 5 hours to 8 hours in the summer season and for about 10 hours to about 18 hours in the winter season. Subsequently, the macerated beans were ground using a grinder after water was added thereto. At this time, the amount of water that was added was 60 kg, which is about 6 times the amount (10 kg) of the beans as the raw material. The ground beans were heated using a steam-heating pot (adding a defoaming agent as needed), and then bean curd refuse was separated therefrom to thereby obtain soybean milk. The obtained soybean milk was placed in respective separate containers and cooled through heat exchange using cold water.

When the temperature of the cooled soybean milk reached 15° C., the prepared coagulant was added to each container and dispersed therein while stirring. The respective containers were stored in a household refrigerator at −20° C. for 30 minutes (Example 14), 6 hours (Example 15), and 12 hours (Example 16), respectively to freeze the contents thereof. The frozen material was warmed in water at 80° C. for 60 minutes, thereby completing the production of bean curds.

TABLE 6

Sensory Test according to Freezing Time

| | Example 14 | Example 15 | Example 16 | Example 1 |
|---|---|---|---|---|
| Classification | 30 minutes | 6 hours | 12 hours | 24 hours |
| Sensory test (flavor) | 5 | 4 | 4 | 4 |
| Sensory test (texture) | 2 | 3 | 5 | 5 |
| Average | 3.5 | 3.5 | 4.5 | 4.5 |

As a result, as shown in Table 6 above, it was confirmed that, in the case in which a general household refrigerator was used, the freezing time was insufficient, and thus unless the entire soybean milk was completely frozen, there was no enhancement in texture.

<Examples 17, 18, and 17> Production of Bean Curd According to Thawing Temperature 3.9 g of an emulsifying coagulant was added to 500 g of soybean milk having a concentration of 10.5 brix, followed by the above-described bean curd production processes (1) to (7), thereby completing the production of bean curds.

To produce soybean milk, first, beans were sieved using a sieve or the like to remove impurities, were sufficiently washed, and were then immersed in water for 5 hours to 8 hours in the summer season and for about 10 hours to about 18 hours in the winter season. Subsequently, the macerated beans were ground using a grinder after water was added thereto. At this time, the amount of water that was added was 60 kg, which is about 6 times the amount (10 kg) of the beans as the raw material. The ground beans were heated using a steam-heating pot (adding a defoaming agent as needed), and then bean curd refuse was separated therefrom to thereby obtain soybean milk. The obtained soybean milk was placed in respective separate containers and cooled through heat exchange using cold water.

When the temperature of the cooled soybean milk reached 15° C., the prepared coagulant was added to each container and dispersed therein with stirring. The respective containers were stored in a household refrigerator at −20° C. for 24 hours to freeze the contents thereof. The frozen material was thawed by warming in water at 20° C. (Example 17), 40° C. (Example 18), and 60° C. (Example 19), respectively. The thawed bean curd was added to water at 80° C., thereby completing the production of bean curd.

TABLE 7

Sensory Test according to Thawing Temperature

| | Example 1 | Example 17 | Example 18 | Example 19 |
|---|---|---|---|---|
| Classification | No thawing | 20° C. | 40° C. | 60° C. |
| Sensory test (flavor) | 4 | 4 | 4 | 3 |
| Sensory test (texture) | 5 | 4 | 3 | 2 |
| Average | 4.5 | 4 | 3.5 | 2.5 |

As a result, as shown in Table 7 above, it was confirmed that, when the thawing temperature was excessively high, the flavor and texture of the bean curd were deteriorated. In addition, when the thawing process was performed, the soybean milk protein of the mixture was cross-linked, thus exhibiting a relatively poor texture even when heated, compared to the case of direct heating without the thawing process.

<Examples 20, 21, and 22> Production of Bean Curd According to Heating Temperature 3.9 g of an emulsifying coagulant was added to 500 g of soybean milk having a concentration of 10.5 brix, followed by the above-described bean curd production processes (1) to (7), thereby completing the production of bean curds.

To produce soybean milk, first, beans were sieved using a sieve or the like to remove impurities, were sufficiently washed, and were then immersed in water for 5 hours to 8 hours in the summer season and for about 10 hours to about 18 hours in the winter season. Subsequently, the macerated beans were ground using a grinder after water was added thereto. At this time, the amount of water that was added was 60 kg, which is about 6 times the amount (10 kg) of the beans as the raw material. The ground beans were heated using a steam-heating pot (adding a defoaming agent as needed), and then bean curd refuse was separated therefrom to thereby obtain soybean milk. The obtained soybean milk was placed in respective separate containers and cooled through heat exchange using cold water.

When the temperature of the cooled soybean milk reached 15° C., the prepared coagulant was added to each container and dispersed therein with stirring. The respective containers were stored in a household refrigerator at −20° C. for 24 hours to freeze the contents thereof. The frozen material was warmed in water at 40° C. (Example 20), 60° C. (Example 21), and 100° C. (Example 22), respectively for 60 minutes, thereby completing the production of bean curds.

TABLE 8

According to Heating Temperature

| | Example 20 | Example 21 | Example 1 | Example 22 |
|---|---|---|---|---|
| Classification | 40° C. | 60° C. | 80° C. | 100° C. |
| Sensory test (flavor) | 3 | 4 | 4 | 4 |
| Sensory test (texture) | 1 | 3 | 5 | 5 |
| Average | 2 | 3.5 | 4.5 | 4.5 |

As a result, as shown in Table 8 above, it was confirmed that, although a soft bean-curd-like form was obtained at a heating temperature of 40° C., the flavor and texture of the bean curd were deteriorated upon heating to an appropriate temperature or less due to the lowered binding strength.

<Examples 23, 24, and 25> Production of Bean Curds According to Heating Time 3.9 g of an emulsifying coagulant was added to 500 g of soybean milk having a concentration of 10.5 brix, followed by the above-described bean curd production processes (1) to (7), thereby completing the production of bean curd.

To produce soybean milk, first, beans were sieved using a sieve or the like to remove impurities, were sufficiently washed, and were then immersed in water for 5 hours to 8 hours in the summer season and for about 10 hours to about 18 hours in the winter season. Subsequently, the macerated beans were ground using a grinder after water was added thereto. At this time, the amount of water that was added was 60 kg, which is about 6 times the amount (10 kg) of the beans as the raw material. The ground beans were heated using a steam-heating pot (adding a defoaming agent as needed), and then bean curd refuse was separated therefrom to thereby obtain soybean milk. The obtained soybean milk was placed in respective separate containers and cooled through heat exchange using cold water.

When the temperature of the cooled soybean milk reached 15° C., the prepared coagulant was added to each container and dispersed therein with stirring. The respective containers were stored in a household refrigerator at −20° C. for 24 hours to freeze the contents thereof. The frozen material was warmed in water at 80° C. for 5 minutes (Example 23), 30 minutes (Example 24), and 120 minutes (Example 25), respectively, thereby completing the production of bean curds.

TABLE 9

Sensory Test according to Heating Time

|  | Example 23 | Example 24 | Example 1 | Example 25 |
|---|---|---|---|---|
| Classification | 5 minutes | 30 minutes | 60 minutes | 120 minutes |
| Sensory test (flavor) | 0 | 3 | 4 | 4 |
| Sensory test (texture) | 0 | 3 | 5 | 4 |
| Average | 0 | 3 | 4.5 | 4 |

As a result, as shown in Table 9 above, it was confirmed that, when the heating time was short, the temperature of a central portion of the frozen material was not sufficiently high, and thus bean curd was unable to be produced.

Example 26

The bean curd produced according to <Example 1> was compressed by applying a force of 1 kg/cm² thereto for 30 minutes.

Figure 4:
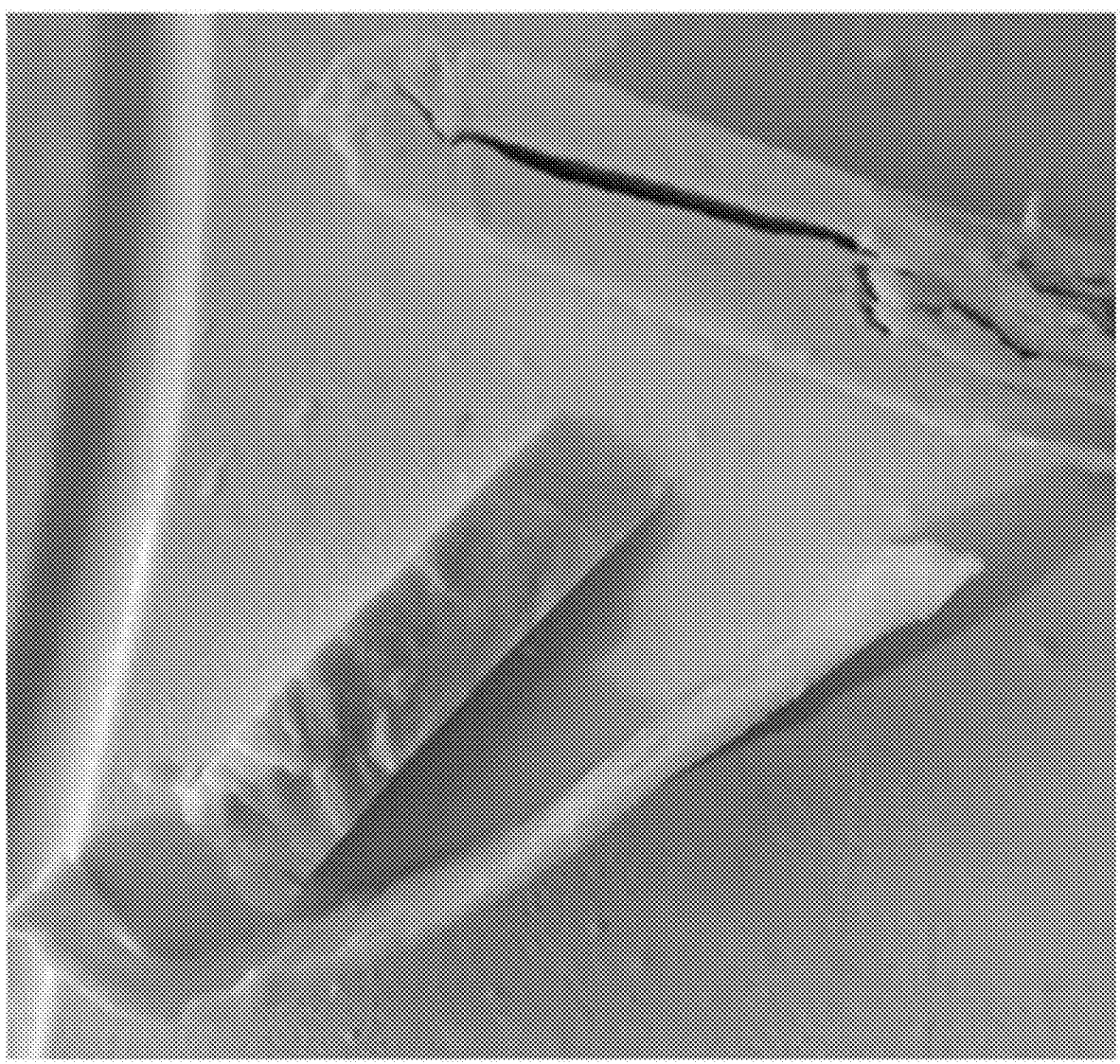
FIG. 4 is an image showing the cross-section of compressed bean curd produced using a bean curd production method according to the present invention.

Referring to FIG. 4, it was confirmed that the texture of the bean curd as illustrated in FIG. 2 was uniformly arranged in one direction through compression and thus became denser.

While general bean curd has a moisture content of about 90%, the moisture content was reduced to about 60% when the bean curd produced according to the present invention was compressed.

The invention claimed is:

1. A method of producing bean curd, the method comprising:
    cooling soybean milk;
    adding a coagulant to the soybean milk at 0.2% to 1.5% by weight of the soybean milk, at −5° C. to 30° C.;
    mixing the soybean milk with the coagulant;
    freezing the mixture of the soybean milk and the coagulant;
    heating the mixture after freezing the mixture; and
    compressing the mixture after heating the mixture.

2. The method of claim 1, wherein the freezing is performed at 0° C. to −60° C.

3. The method according to claim 1, wherein the freezing is performed for 10 minutes to 48 hours.

4. The method according to claim 1, wherein the heating is performed at 50° C. to 120° C.

5. The method according to claim 1, wherein the heating is performed for 10 minutes to 2 hours.

6. The method according to claim 1, further comprising:
    freezing the soybean milk to which the coagulant is added or curd while maintaining a temperature at a freezing point or less; and
    heating the frozen soybean milk or curd after thawing or without thawing.

7. The method according to claim 6, further comprising any one or two or more selected from compressing, molding, and packaging.

8. Bean curd produced using the method of claim 1,
    wherein the bean curd has a texture in a uniformly layered form before compression, has a form arranged uniformly and densely in one direction after compression, and has a moisture content of 50% to 80%.

9. A food substance using the bean curd of claim 1.

* * * * *